C. PAULI.
TROLLEY.
APPLICATION FILED APR. 8, 1912.
1,041,155.
Patented Oct. 15, 1912.
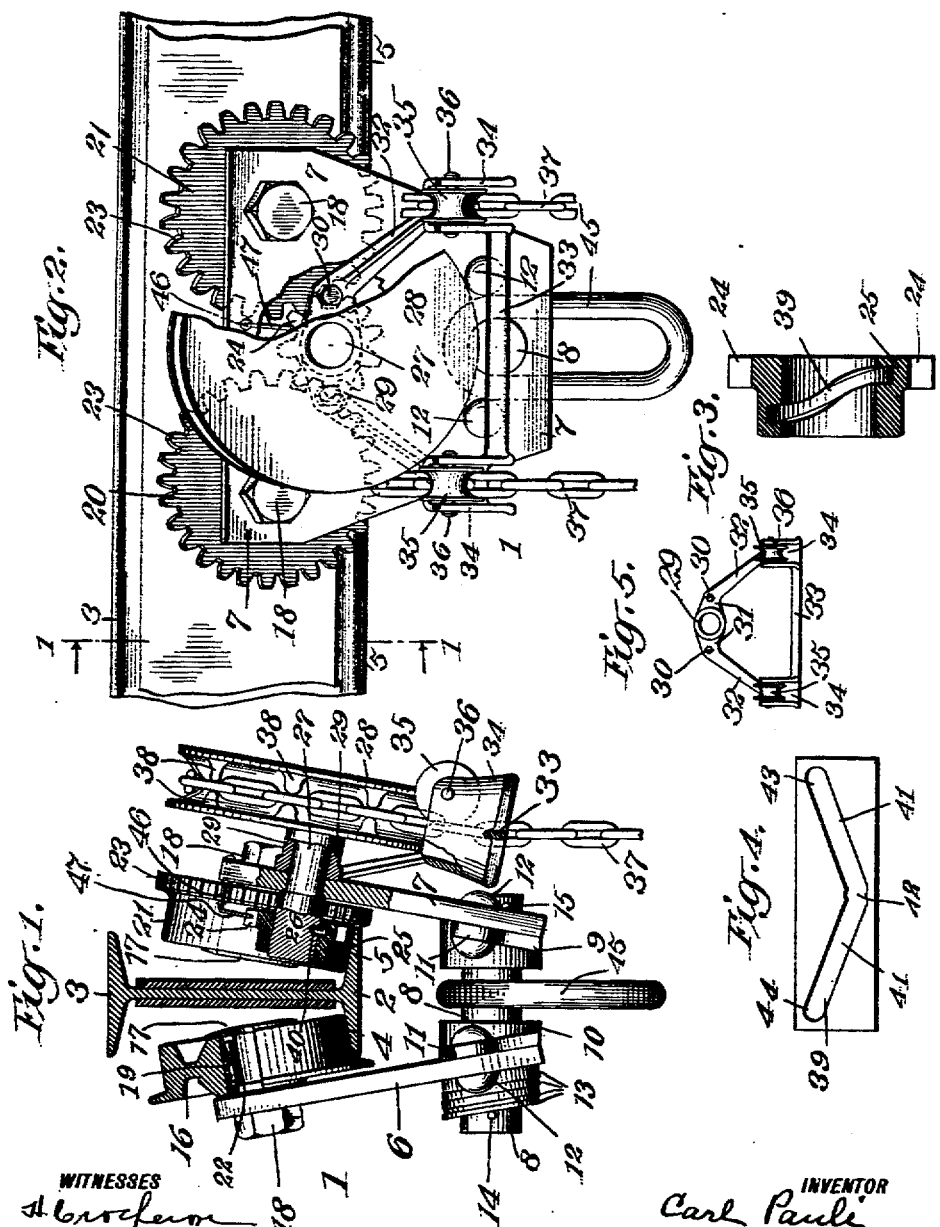

UNITED STATES PATENT OFFICE.

CARL PAULI, OF ROSELLE PARK, NEW JERSEY, ASSIGNOR TO NEW JERSEY FOUNDRY AND MACHINE COMPANY, A CORPORATION OF NEW JERSEY.

TROLLEY.

1,041,155.  Specification of Letters Patent.  Patented Oct. 15, 1912.

Application filed April 8, 1912.  Serial No. 689,129.

*To all whom it may concern:*

Be it known that I, CARL PAULI, a citizen of the United States, and a resident of Roselle Park, in the county of Union and State of New Jersey, have invented certain new and useful Improvements in Trolleys, of which the following is a specification, taken in connection with the accompanying drawing, which forms a part of the same.

This invention relates to trolleys and more particularly to trolleys which can be converted or changed from a non-geared trolley to a geared trolley, or the reverse, as it is desired to transport heavy or light loads by means of its aid. By the term "trolley" I mean any carriage which moves along a rail, or rails, for the transportation of heavy or light loads; it, of course, being understood that the two flanges upon which the traction wheels operate are in effect two rails or traction surfaces.

My present invention is a simplified and cheaper form of my improved trolley patented in U. S. Patent No. 963,387 of July 5, 1910.

In the accompanying drawing I have shown simply for purposes of illustration, one illustrative embodiment of this invention, in which the same reference numerals refer to similar parts in the several figures.

Figure 1 is a vertical transverse section substantially on the line 1—1 of Fig. 2 looking in the direction of the arrows; parts of the trolley mechanism being broken away for the purposes of clearer illustration; Fig. 2 is a side elevation of my trolley partly broken away for purpose of illustration; Fig. 3 is a vertical section of the driven member which in this form of my invention I have shown for purposes of illustration as a pinion; Fig. 4 is a plan view of the development of the cam slot with which the interior of the driven member or pinion is provided; Fig. 5 is a detail side elevation, on a smaller scale, of the sleeve and hanger carried by it.

In the illustrative embodiments of this invention shown in the drawing, 1 is a trolley adapted to run upon any suitable rail or rails as for example the flange 2 of the I-beam 3, the traction surfaces 4 and 5 being in effect different rails for the traction wheels of the trolley. This trolley may be formed in various ways but preferably I form it of side plates 6 and 7 preferably mounted at an angle to each other, their lower ends being connected together by means of a pin 8 passing through suitable apertures in the ends of the side plates 6 and 7 and also through the apertured bearings 9 and 10, which are formed of any suitable material but preferably of cast iron and provided with ears 11, 11 so that the bearings may be securely held to the respective side plates 6 and 7 by means of the rivets 12, 12, or other suitable fastening means. Suitable washers 13, 13 may be provided, if necessary, between the side plate 6 and the cotter pin 14 or other suitable fastening member. A similar cotter pin 15 is preferably used on the other end of the pin 8.

Each of the side plates 6 and 7 is also provided with traction wheels to contact with the rails 4 and 5. Preferably the side plate 6 is provided with two traction wheels 16, 16 (only one being shown) each traction wheel being secured to the side plate 6 by a headed bolt 17 and nut 18. Any suitable anti-friction device may be used, if desired, such as the rollers 22. I also preferably employ a steel bushing 19, though, of course, it is to be understood that any other suitable construction may be employed or the anti-friction device may be omitted without departing from my invention.

On the opposite side plate 7 I mount two similar traction wheels 20 and 21 by similar headed bolts 17, 17 and nuts 18, 18. In these traction wheels I also preferably employ any suitable anti-friction device such as the traction wheels 16, 16 are provided with. The traction wheels 20 and 21 are carried by the side plate 7 and consequently are mounted on the same side of the trolley. One or both of the traction wheels 20 and 21 are provided with some suitable form of friction surface to coöperate with a similar surface carried by a driven member so that when the friction surfaces are in engagement and the driven member is rotated, power will be transmitted to the traction wheels 20 and 21, or only one of them should it be desirable to omit the friction surface on the other wheel.

For purposes of illustration I have shown both traction wheels 20 and 21 provided with friction surfaces in the form of gear teeth 23, 23 which are adapted to coöperate in a certain position of the parts with similar gear teeth 24 upon the driven member 25 which I have shown by way of example as a pinion. This driven member 25, or pinion, is mounted on the inner end 26 of the driving member or stub shaft 27 which passes through the side plate 7 and upon which is keyed or otherwise secured a hand, chain or similar wheel 28. To give additional bearing surface to the stub shaft 27 and also to form a support for a hanger to be hereinafter described, if such hanger is used, I preferably mount a hollow sleeve 29, shown in section in Fig. 1 and in side elevation on a smaller scale in Fig. 5, upon the side plate 7 by passing bolts or other securing means 30, 30 through the ears 31, 31 of the sleeve and the side plate 7 so that the sleeve is secured to the side plate 7 and forms an extended bearing for the stub shaft or driving member 27. To each of the ears 31, 31 of the sleeve 29 I secure in any suitable manner arms 32, 32 which are connected at their lower ends by a strut 33. Where the strut and arms meet I preferably form open bells 34 within which I mount the sheaves 35, 35 by means of the arbors 36, 36. The arms 32, 32 and the strut 33 form a hanger; but it is to be understood that this hanger may be omitted without departing from my invention.

As my trolley is usually, though not necessarily, located at such an elevation that the wheel 28 cannot readily be directly operated by hand, I employ some intermediate member as a chain 37 to operate it and preferably provide the periphery of the wheel with lugs 38, 38 to coöperate with the chain 37 and prevent lost motion between the two. As the wheel 28 is preferably arranged at an angle to the perpendicular, the sheaves 35, 35 and bells 34, 34, if employed, serve to keep the chain 37 in alinement on the wheel.

In either the driving member, the stub shaft 27, or in the driven member, the pinion 25, I arrange a double cam slot and mount a pin in the other member. For purposes of illustration I have shown the double cam slot 39 in the pinion 25 and a coöperating pin 40 carried by the driving member 27. This double cam slot is shown developed in Fig. 4 and comprises two separate portions 41, 41 having a common meeting point 42 and ends 43, 44.

By providing my driving and driven members with such a cam and pin, it is apparent that when the pin 40 is at either end 43 or 44 of the cam 39, the driven member or pinion 25 will be in engagement with the teeth 23, 23 of the wheels 20 and 21. When the driven member or pinion 25 is in this position, with its gear teeth coöperating with those carried by the traction wheels 20 and 21, the rotation of the driving member or stub shaft 27, by hand or by the chain 37 or otherwise, will transmit power from the wheel 28 to the traction wheels 20 and 21. In this position of the parts, the trolley is a geared trolley and one adapted to transmit heavy loads at a relatively slow speed by continuing to rotate the traction wheel or wheels 20 and 21 through the pinion 25 by operating the wheel 28 through the chain 37, or otherwise, until such time as the trolley has deposited the load in the desired location.

If it is then desired to move the trolley light to another location, or another load, it is merely necessary to give the wheel 28 a partial rotation, in a direction opposite to that in which it was last traveling, when the pin 40 will travel from the end 43 or 44, as the case may be, along the cam portions 41 until the point 42, Fig. 4, is reached when the entire driven member or pinion 25 will have been caused to move laterally upon the driving member or stub shaft 27 to the position shown in Fig. 1, thereby disengaging the teeth 24 from the teeth 23, 23 on the wheels 20 and 21, if both the wheels 20 and 21 are provided with teeth 23.

When the parts are in this position, the trolley becomes a plain or ungeared trolley and by grasping both reaches of the chain 37 or by simply pushing the load the trolley may be quickly moved, at high speed, along whatever track it may be mounted upon until it is brought above or adjacent to its next load, its movement under these conditions being that simply of a plain ungeared trolley. If its next load is a relatively light one so that the friction of the traction wheels on the rails is comparatively little, it can be continued to be moved as an ungeared trolley so as to transport the load quickly to the desired location. It may continue to be used as an ungeared trolley until such time as it is again desired to transport a relatively heavy load, or one which cannot be readily transported by simply dragging the trolley along the rails by means of the chain 37. In such an event, by again giving the wheel 28 a relative rotation, either directly or through the chain 37, the pin 40 will be caused to move down either one of the surfaces 41, 41 until it contacts with the end 43 or 44, when the pinion or driven member 25 will be thrown back into mesh with the teeth 23, 23 carried by the wheels 20 and 21, the trolley then becoming a geared trolley. It is, therefore, apparent that with no additional equipment, the user has at his instant command either a geared or a plain trolley and one which he can instantly change from one to the other depending upon the particular load to be moved.

Any suitable supporting mechanism may be connected either directly to the pin 8 or 13, to the ring 45. This lifting or supporting mechanism being no part of my invention I have not illustrated it.

By my invention, I am enabled to operate the trolley through one driven member or pinion which is so mounted as to be preferably above the traction surfaces of the wheels of the trolley and thereby permits me to form a trolley of minimum height which is a material consideration where overhead room is limited, and it is desired to mount the track and trolley so as to have them at a sufficient elevation to permit free movement beneath them. When both the traction wheels 20 and 21 are provided with gear teeth, which is the preferred construction, the single pinion directly coöperates with and drives both traction wheels.

In some cases, though not necessarily, I have found it expedient to apply friction to the driven member or pinion 25 when it is out of engagement with the coöperating gear teeth 23, 23 carried by the traction wheels 20 and 21 so as to prevent an accidental reëngagement of the driven member or pinion 25 with the teeth 23, 23.

I have shown one form of such friction or retarding device, but to which my invention is not to be limited, as a spring arm 46, Figs. 1 and 2 mounted on the side plate 7, preferably between the traction wheels 20 and 21 and provided with a bent portion 47 to directly engage with the teeth 24 on the pinion 25 when it is in its disengaged or inoperative position as shown in Fig. 1.

The spring arm 46 holds the driven member 25 from relative movement on the driving member or stub shaft 27 until such time as it is desired to cause a positive relative movement between the pinion and stud shaft, by operating both reaches of the chain 37 or by simply pushing the load, or operating the wheel 28 directly, when the spring arm 46 will become disengaged from the teeth 24 of the pinion, not to be again engaged with them until the pinion is disengaged from the traction wheels 20 and 21.

My trolley is extremely simple, of but a few parts, inexpensive to manufacture and has proved extremely efficacious in use.

Having thus described this invention in connection with an illustrative embodiment thereof to the details of which I do not desire to be limited, what is claimed as new and what it is desired to secure by Letters Patent is set forth in the appended claims:

1. The combination with a trolley of one or more traction wheels carried by the trolley and provided with gear surfaces, a driving member, a driven member, both driving and driven members mounted above the tread of the traction wheels, and automatic means to operate said driving and driven members to connect or disconnect said driven member from the gear surface or surfaces, permitting the trolley to operate either as a plain or geared trolley.

2. The combination in a trolley of one or more traction wheels provided with teeth, a driving member, a pinion, both driving member and pinion being mounted above the tread of the traction wheels, and automatic means to operate the driving member and pinion to connect or disconnect said pinion from the teeth carried by the traction wheels, permitting the trolley to operate either as a plain or geared trolley.

3. In a trolley the combination of a plurality of traction wheels, gear teeth carried by two traction wheels on the same side of the trolley, a driving member, a single pinion adapted to coöperate with the gear teeth carried by the two traction wheels, and automatic means to cause the pinion to become connected or disconnected from the gear teeth, forming either a plain or geared trolley.

4. In a trolley the combination of a plurality of traction wheels, gear teeth carried by two traction wheels on the same side of the trolley, a driving member, a single pinion mounted on the same side of the trolley and above the tread of the traction wheels and adapted to coöperate with the gear teeth carried by the two traction wheels, and automatic means to cause the pinion to become connected or disconnected from the gear teeth forming either a plain or geared trolley.

5. In a trolley, the combination of two traction wheels on the same side of the trolley, friction surfaces connected to the two traction wheels, a driving member mounted on the same side of the trolley and adjacent to the two traction wheels, a driven member mounted adjacent to the two friction surfaces, and automatic means to connect or disconnect said driven member to or from the friction surfaces carried by both traction wheels, permitting the trolley to operate either as a plain or geared trolley.

6. In a trolley the combination of one or more plain traction wheels mounted on one side of the trolley, a plurality of traction wheels mounted on the other side of the trolley, gear surfaces carried by two of the traction wheels on one side of the trolley, a driving member, a single pinion, and automatic means between the driving member and pinion causing it to engage or disengage with the teeth on the traction wheels to form either a plain or geared trolley.

7. In a trolley, the combination of one or more plain traction wheels mounted on one side of the trolley, a plurality of traction wheels mounted on the other side of the trolley, gear surfaces carried by two of the traction wheels on one side of the trolley, a sleeve connected to the trolley, arms connected to the sleeve, pulleys carried by the arms, a flexible member passing over the wheel and adapted to be guided by the wheels carried by the arms, a driving member passing through the sleeve, a pinion, and automatic means between the driving member and pinion causing it to engage or disengage with the teeth on the traction wheels to form either a plain or geared trolley.

8. The combination in a trolley of one or more traction wheels provided with teeth, a driving member, a pinion, both driving member and pinion being mounted above the tread of the traction wheels, and on the same side of the trolley, and automatic means to operate the driving member and pinion to connect or disconnect said pinion from the teeth carried by the traction wheels, permitting the trolley to operate either as a plain or geared trolley, and a hanger.

CARL PAULI.

Witnesses:
E. HUBER,
D. TULLOCH, Jr.

Copies of this patent may be obtained for five cents each, by addressing the "Commissioner of Patents, Washington, D. C."